Nov. 5, 1940.  H. C. MUNSON  2,220,421
DRINKING FOUNTAIN
Filed Sept. 12, 1939
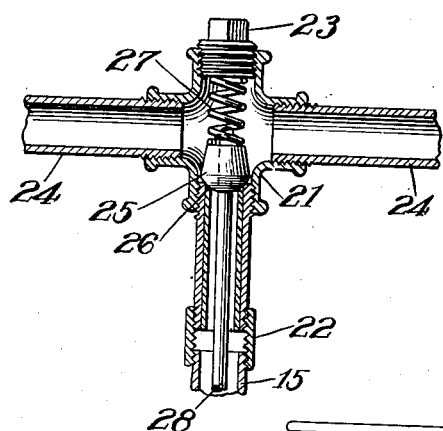
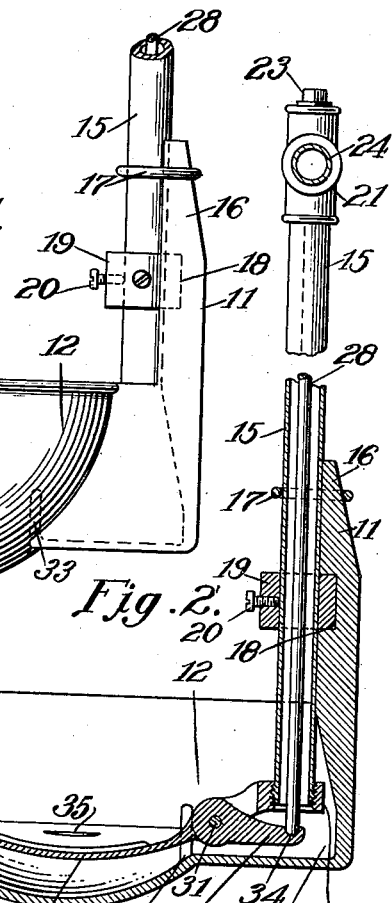
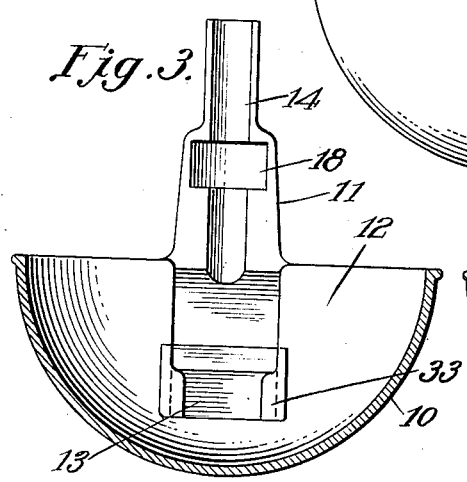
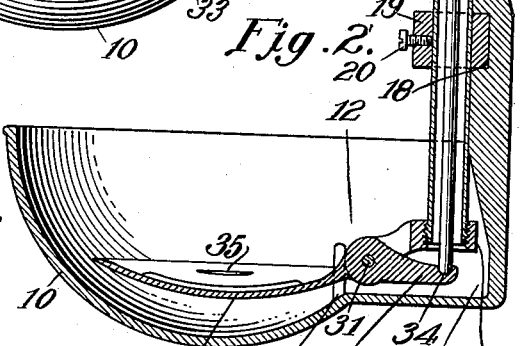
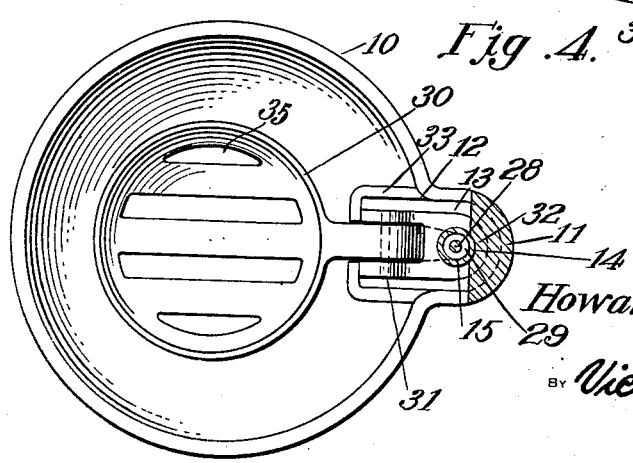
Howard C. Munson
INVENTOR
BY Victor J. Evans & Co.
ATTORNEYS Patented Nov. 5, 1940

2,220,421

UNITED STATES PATENT OFFICE 2,220,421

DRINKING FOUNTAIN

Howard C. Munson, Massena, N. Y.

Application September 12, 1939, Serial No. 294,543

3 Claims. (Cl. 119—75)

The invention relates to a drinking fountain and more especially to a stock waterer or drinking vessel for animals.

The primary object of the invention is the provision of a device of this kind wherein the valve for controlling the water supply to the bowl is so arranged to be completely out of reach of the animals when drinking from the bowl and also to be away from salt, water and animal saliva during the drinking period, thereby eliminating rust and corrosion usually found to be a source of trouble and expense.

Another object of the invention is the provision of a device of this character wherein the bowl can be readily removed without completely dismantling the entire setup of said device, the bowl being fastened in place in a novel manner.

A further object of the invention is the provision of a device of this character, wherein the operating pan within the bowl is held in a manner to assure operation of the valve for controlling the water supply without any liability of dismembering such pan or undue displacement during the use of the device.

A still further object of the invention is the provision of a device of this character, wherein the water supply is controlled by the animal when in the act of drinking from the bowl, the water supply being regulated by pressure upon an operating pan arranged within the bowl.

A still further object of the invention is the provision of a device of this character, which is simple in its construction, thoroughly reliable and efficient in operation, readily and easily installed, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a fragmentary side elevation of a device constructed in accordance with the invention.

Figure 2 is a vertical longitudinal sectional view thereof.

Figure 3 is a vertical transverse sectional view through the bowl.

Figure 4 is a top plan view partly in section.

Figure 5 is a vertical sectional view through the valve and adjuncts employed with the device.

Similar reference characters indicate corresponding parts throughout the several views in the drawing.

Referring to the drawing in detail, the device constructed in accordance with the invention comprises a bowl 10 formed at its rearmost portion with an upstanding shank 11 and the hollow 12 of this bowl is continued into the shank 11 by the provision of a recess 13 in the latter. The shank is provided with a channel 14 in one side thereof and longitudinally directed for the reception of a discharge pipe 15, the uppermost portion of the said shank at that side opposite the channel 14 presents a beveled face 16 giving an upwardly tapered formation to the upper terminal of said shank while slidably fitting the pipe 15 is a ring 17 which is engageable over the upper tapered end of the shank 11 for the clamping of the said pipe and shank together. The ring 17 wedges upon the upper tapered end of the shank 11 holding the pipe 15 in the channel 14. This pipe 15 opens into the recess 13 which communicates with the bowl 10 for supplying water thereto.

The shank 11 at the channel side thereof has provided therein a seat 18 for accommodating a locking collar 19, which encircles the pipe 15 and is provided with one or more set screws 20 working against said pipe and in this manner the pipe will be releasably held engaged with the shank 11 of the bowl 10. Also the bowl 10 can be adjusted through the use of the ring 17 and the collar 19 with respect to the pipe 15.

The pipe 15 is detachably coupled with a four-way union 21, the coupling being indicated at 22, and one way of this union is fitted with a plug 23. Opposite two ways of the union 21 have connected thereto the sections 24 of a water supply line while the other way is a fitting for the coupling 22. The union 21 constitutes a valve casing in which is arranged a lift valve 25, being adapted for seating at 26, and urged to this seat by a coiled spring 27 active upon the valve. The valve 25 is carried on a lift rod or stem 28 which extends downwardly through the pipe 15 to be acted upon by a trigger 29. This trigger 29 is integrally formed with an operating pan 30 arranged within the bowl 10 and pivoted for vertical swing at 31 in a bearing 32 detachably fitting the lowermost end of the pipe 15.

The bowl 10 interiorly thereof is formed with retaining and guide lugs 33, these being arranged at opposite sides of the trigger 29 outwardly of the pivot 31 and bearing 32 so that the pan 30 can not shift laterally and also maintaining the bearing 32 in a fixed position so that the trigger 29 will at all times in the working of the device align with the stem or rod 28. This trigger 29 has a seat 34 therein for the lowered rounded end of the stem or rod 28.

On pressing upon the pan 30, the valve 25 seated at 26 will be lifted from its seat against the resistance of the spring 27 and water supply from the line 24 will be delivered to the bowl 10 for the watering of animals, the animal drinking therefrom exerts pressure upon this pan 30 to lower the same or operate it and thereby regulate or control the water flow to the said bowl.

The recess 13 houses the bearing 32 and trigger 29 so that there is no liability of the animal making contact with these parts and a positive operation of the pan 30 is assured in the use of the device in that the pan has a maximum exposure within the bowl so that the animal can make contact therewith. The pan is slotted at 35 so as to avoid trapping of water therein.

What is claimed is:

1. The combination of a liquid supply pipe, of a bowl having a shank provided with a seat for said pipe and also having a tapered end portion, a ring encircling the pipe and engageable with the tapered end portion of said shank, a locking collar seated in the shank and embracing the pipe, means fastening the pipe in said collar, and depressible means operating within the pipe for controlling the liquid supply therethrough to said bowl.

2. The combination of a liquid supply pipe, of a bowl having a shank provided with a seat for said pipe and also having a tapered end portion, a ring encircling the pipe and engageable with the tapered end portion of said shank, a locking collar seated in the shank and embracing the pipe, means fastening the pipe in said collar depressible means operating within the pipe for controlling the liquid supply therethrough to said bowl, a spring-seated valve within the pipe and included in said last-named means, and guides within the bowl for the said last-named means.

3. The combination of a liquid supply pipe, of a bowl having a shank provided with a seat for said pipe and also having a tapered end portion, a ring encircling the pipe and engageable with the tapered end portion of said shank, a locking collar seated in the shank and embracing the pipe, means fastening the pipe in said collar, a valve seated within the pipe, a pan arranged pivotally supported, and a stem connected with said valve and operated by said pan.

HOWARD C. MUNSON.